Figure 1:
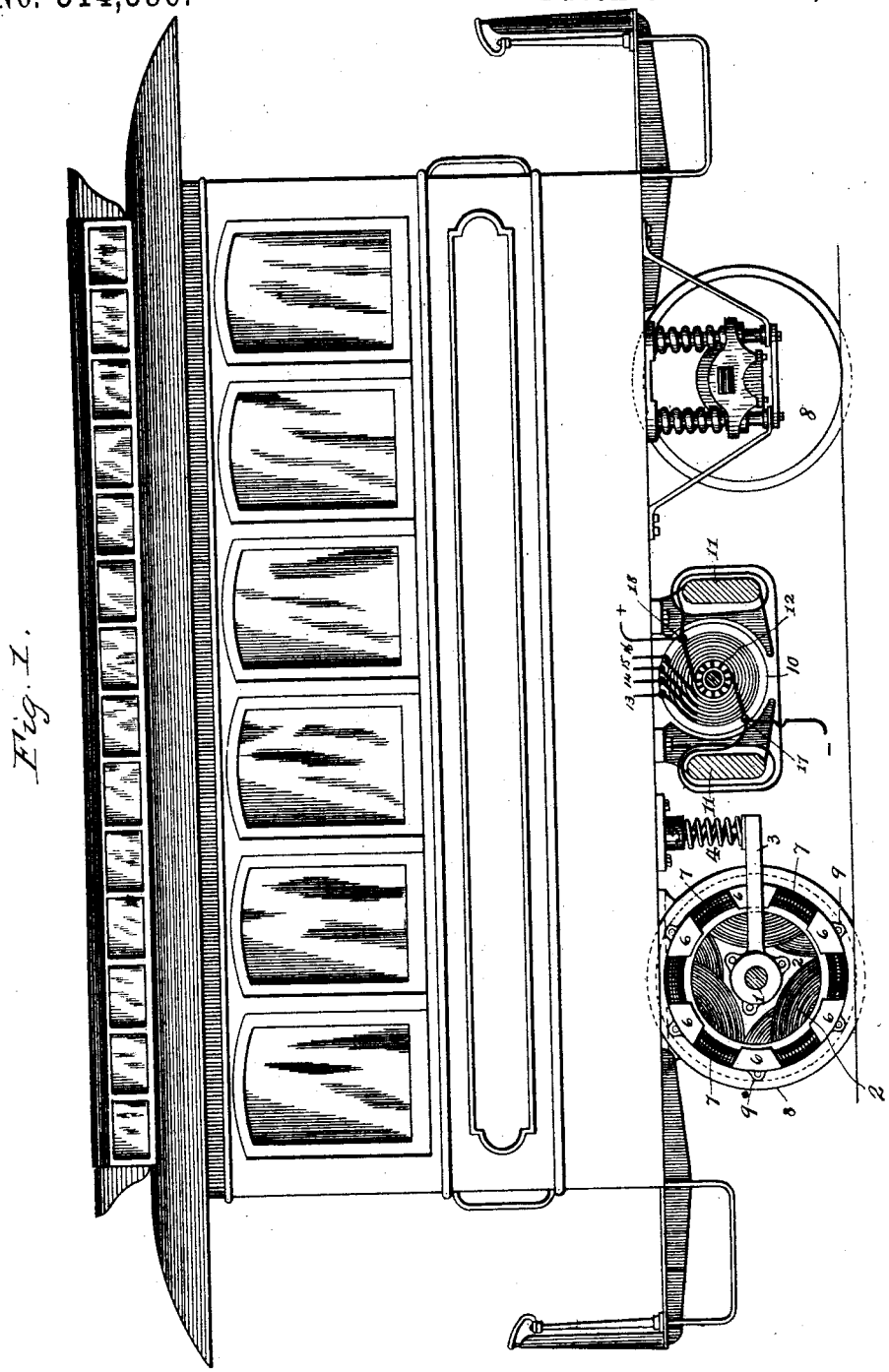

(No Model.)  2 Sheets—Sheet 1.

C. S. BRADLEY.
ELECTRICAL TRANSMISSION OF POWER.

No. 514,586. Patented Feb. 13, 1894.

WITNESSES:

Charles S. Bradley, INVENTOR

BY
McTighe & Worthington
ATTORNEYS.

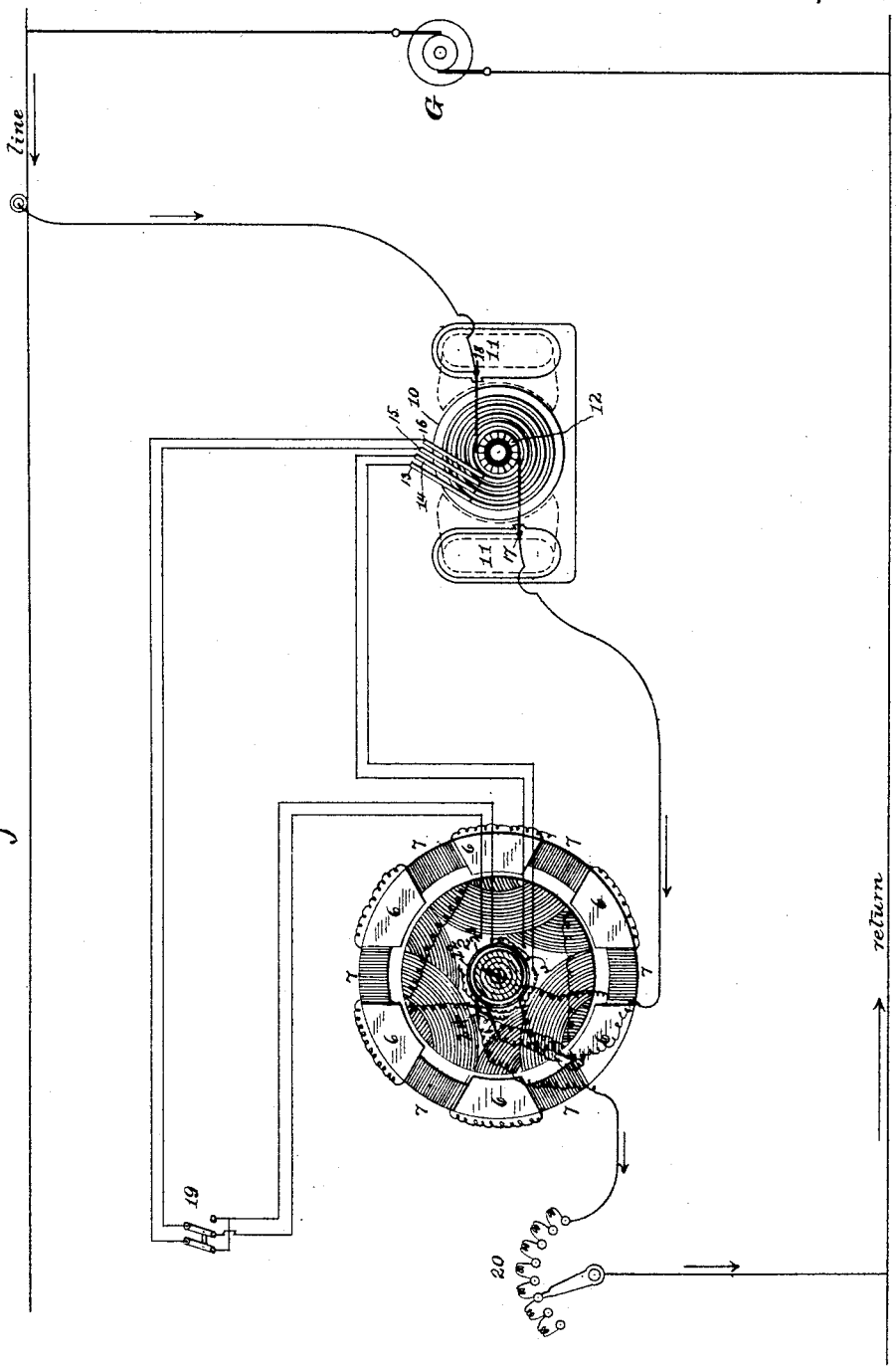

UNITED STATES PATENT OFFICE.

CHARLES S. BRADLEY, OF YONKERS, NEW YORK.

ELECTRICAL TRANSMISSION OF POWER.

SPECIFICATION forming part of Letters Patent No. 514,586, dated February 13, 1894.

Application filed June 23, 1890. Serial No. 356,363. (No model.)

*To all whom it may concern:*

Be it known that I, CHARLES S. BRADLEY, a citizen of the United States, residing at Yonkers, in the county of Westchester and State of New York, have invented certain new and useful Improvements in Electrical Transmission of Power; and I do hereby declare the following to be a full, clear, and exact description of the invention, such as will enable others skilled in the art to which it appertains to make and use the same.

This invention relates to an electrical system for transmitting power. It is especially applicable to the operation of electrically propelled cars or other vehicles, whether the electrical energy be furnished from a stationary generator by means of an overhead or underground feeder, or from a generator carried with the vehicle.

My invention consists in the arrangement and combination of devices substantially as hereinafter more fully described and claimed.

In the drawings which form part of this specification Figure 1 is a side elevation partly in section of a street car having as its propelling power a multipolar electric motor applied direct without gearing. Fig. 2 is a diagram of the circuits and electrical devices through whose conjoint agency all the features of my invention are utilized.

In applying the invention to street cars it is obvious that the electric motor may be in duplicate for application to both forward and rear axles, but as this is merely duplication the invention will be more easily understood by describing it as applied to only one axle.

On the axle 1 as a means of suspension I place the armature 2, which in this case is of the drum type, so that the wheels and axle may revolve freely without necessarily setting the armature into rotation. The rotation of the armature is positively prevented while permitting a slight flexibility of its position, by means of the arm or arms 3 projecting out and having the buttress spring 4 interposed between it and a suitable fixture 5 of the car or truck. The field-magnet consists of an annular structure having the pole-pieces 6 and the interposed energizing coils 7, there being an even number of both. The structure 6 and 7 is fitted to either one or both of the wheels 8 and rotates therewith, a convenient means of attachment being the lugs 9 on the field-magnet. Current is led to the field-magnet through two contact rings 22, 23, mounted on the car axle, suitable brushes 21, 24, bearing upon the contact rings. I prefer to make both armature and field-magnet of considerable length so as to get a large amount of power available. The poles 6 of the field-magnet will be alternately N and S polarity. In the given case where there are six field poles I first wind the armature with three coils, each passing along the face of the armature, and then over its ends and back along the face at a point one-sixth of a circumference from its first position. This arrangement leaves between the respective sections open spaces of about the same size, and in these spaces I wind a similar series of three coils. By this arrangement the armature has its face wound with two sets of coils, one set overlapping into the other and occupying successive portions of the armature surface. In the armature of a six pole machine therefore there will be on the surface six coils overlapping in position. The six coils are arranged in two groups of three equidistant coils, each group having its three coils connected in series, leaving therefore four terminals for external connection to the source of supply of current. Such an arrangement obviously requires that the current delivered into the armature should be alternating, and that the currents delivered into one set of coils should be one-quarter phase behind the currents delivered into the other set of coils, while the current for the field-magnet coils should be continuous in character, so as to produce a constant magnetization of the pole-pieces, thus constituting an alternating current motor of the synchronous type.

I provide for the requirement of two alternating currents one-quarter of a phase apart, preferably in the following manner: I place in a suitable position a phasing device which is of the general character of an electric motor, and consists of the rotating armature 10 having an ordinary closed coil winding, and the field-magnets 11 arranged in shunt to the armature. The armature 10 is provided with the customary commutator 12 and connections are made from points ninety degrees apart on the said commutator respectively, to four contact rings suitably disposed and having bearing thereon the respective brushes 13, 14, 15 and 16. The coils of the field-magnets 11 are connected directly to the main brushes 17 and 18 in the manner of a shunt from a direct current supply circuit of any desired character, such as a battery on the car or an overhead or underground conductor with return circuit from a distant generator G, (although the magnets 11 may be arranged in series with the armature 10.) From the brushes 13, 14 a circuit is taken directly to the terminals of one of the groups of coils on armature 2; from the other pair of brushes 15, 16 a circuit is taken to the other group of coils on the armature 2, but on the way passes through a reversing switch 19 which in practice would be in such position as to be under convenient control of the driver. The arm 3 forms a convenient means of leading the circuit wires into the coils of the armature 2, the leading wires being laid along such arm.

As the strength of the current should be capable of graduation to any desired extent, I provide for this by inserting an adjustable resistance 20 at a suitable point in the circuit. The circuit, beginning with the source of direct current supply, goes to brush 18, thence through the armature 10 to brush 17, whence it passes direct to one terminal of the field coils 7, by way of brush 21 and contact ring 22 from the other terminal of which it passes to contact ring 23 and brush 24 to the adjustable resistance 20, from which it returns directly to the main generator by earth or direct wire. By arranging the contact arm of the adjustable resistance 20 as shown it may be utilized also as a switch for opening the circuit, and when open obviously no current will flow.

Assuming the resistance switch 20 to be closed, the currents will flow in the following manner from the source of supply passing first to the brush 18, a portion of the current will be diverted through the field-magnets 11, a further portion will pass through the armature 10 thereby setting the latter in operation, and will then pass on through the field-magnets 7, energizing them, and back to the source of current supply through the resistance switch 20; the remainder of the current flowing in the armature 10 is by reason of the peculiar connections established by the contact rings and brushes 13, 14, 15 and 16 transformed into two alternating currents, as fully set forth in United States Letters Patent No. 390,439, issued to me October 2, 1888. Two separate circuits are as already described established through the armature 2, one circuit having for its terminals the brushes 13, 14, and the other having for its terminals the brushes 15, 16; these two currents are a quarter phase apart, that is to say, when the wave is at a maximum positive in circuit 13, 14 it is zero in the circuit 15, 16, and vice versa.

The result on the armature 2 is that it exerts a constant pull on the pole-pieces of the field-magnet 6 and 7, which being attached to the wheels of the car cause them to rotate, since the arm 3 prevents the rotation of the armature.

Obviously, if the order of lag of phase in the two circuits of the armature 2 be reversed, the direction of rotative effort in the latter will be correspondingly reversed. This change can be readily effected by using a reversing switch in either one of the two circuits leading from the brushes 13 14, 15 16.

For the sake of brevity I will hereinafter describe the machine 10, 11, 12 by the term "phasing-device," and the motor attached to the axle simply by the term "motor." The latter having a constant field and alternating currents in its armature is of the type commonly known as synchronous; that is to say, the resultant action per revolution will be the same with reference to the time-periods of the actuating currents as take place in the generator, which in this case is the phasing-device which I have described as adapted to receive a direct continuous current and transform it into two alternating currents one-quarter of a phase apart. This being the case it will be easily seen that the number of revolutions in the motor when the latter is working at maximum efficiency (i. e. at full speed and full load) may be reduced to a minimum. The phasing-device being a two-pole machine and the motor being a six-pole machine, if the former rotates at one thousand revolutions the latter will at full speed and load rotate at three hundred and thirty-three revolutions. If such phasing-device rotates at one thousand revolutions, and the motor is constructed with forty poles, the latter will rotate at fifty revolutions when at synchronous speed. By inserting a rheostat in any suitable manner in the circuit of the phasing-device the speed of the latter may be regulated according to the requirements of the load on the car or the grade on which it may at the time be running. At the moment of starting the phasing-device will of course produce an exceedingly small number of waves per minute with a corresponding action in the motor; since the latter is synchronous with the former its maximum torque will be produced from the very beginning. This adaptability of the invention to all speeds permits the placing of the motor directly on the axle of the car without the necessity of interposing any multiplying gear of any kind, although in some cases one pair of gears may be found desirable. It also enables me to use a multipolar motor having a great number of poles and thereby obtain the greatest static pull with the least weight of material and still run at low speed without interfering with the requirements of high speed on the part of the car itself. This cannot be done at present in the ordinary continuous current motors, because the multiplication of poles requires a great number of sections in the commutator and a great number of coils in the armature, thereby adding so greatly to the cost and difficulty of keeping the mechanism in order, as to render the idea impracticable.

In present systems of electric railway motors a commutator must be on the motor shaft and connected directly with the driving armature. By my invention, on the contrary, I am able to effect the commutation altogether outside of the motor itself. Hence a switch can be readily introduced between such commutating device and the motor so as to permit of the reversal of the latter, as well as to allow of the placing of the commutating devices at a convenient point away from the running gear of the car, and it can be covered in completely so as to be free from the bad effects of dust, water, snow, &c.

Although the motor hereinbefore described is of the synchronous type I have succeeded in eliminating all the difficulties which usually accompany the attempted use of synchronous motors for work which calls for variation of speed. The introduction of the phasing-device removes all difficulty in this direction and permits the speed of the motor to be changed at will without in any manner interfering with its mechanical efficiency. It will be understood that the rheostat 20, while not materially affecting the volume of current flowing through the field-magnets 7 of the motor, nevertheless is able to produce wide variations in the difference of potential existing between the terminals of the phasing-device, and the speed of rotation of both the phasing-device and the motor armature 2 will depend upon such difference of potential. Consequently, the speed of both phasing-device and the motor armature may be raised or lowered to any desired extent without affecting the torque of the motor, yet in all the variations of speed the motor will be synchronous with the phasing-device. Such a result I believe to be entirely novel in the use of alternating current motors. Instead of the rheostat 20 any other means for varying the difference of potential at the terminals of the phasing-device may be adopted, and the choice of such means will be within the province of the constructer, as a variety of devices are available for the purpose.

I claim as my invention—

1. In a system for transmitting power, the combination of a continuous current generator, a phasing device electrically connected therewith for converting the continuous current into alternating currents of differential phase, and an electric motor, the field-magnet of which is charged by a continuous current, and the armature of which is charged by the alternating currents of differential phase.

2. The combination of a continuous current generator, a phasing device for converting said current into alternating currents of differential phase, an electric motor having its field-magnet charged by the continuous current and its armature charged by the alternating currents of differential phase, and a rheostat in the continuous current circuit for the purpose described.

In testimony whereof I affix my signature in presence of two witnesses.

CHARLES S. BRADLEY.

Witnesses:
T. J. McTighe,
E. C. Grigg.